United States Patent [19]

Mayer et al.

[11] 3,798,358

[45] Mar. 19, 1974

[54] FACSIMILE TRANSMISSION SYSTEM

[76] Inventors: Norbert Adolf Mayer, Unertlstrasse 25; Gerhard Möll, Unertlstrasse 24, both of 8000 Munich 23, Germany

[22] Filed: Apr. 25, 1972

[21] Appl. No.: 247,437

[30] Foreign Application Priority Data

Apr. 27, 1971 Germany .......................... 2120515

[52] U.S. Cl. ......... 178/5.6, 178/5.8 R, 178/DIG. 23

[51] Int. Cl. .............................................. H04n 5/04

[58] Field of Search ........... 178/5.6, 5.8 R, DIG. 23

[56] References Cited

UNITED STATES PATENTS

| | | | |
|---|---|---|---|
| 3,507,986 | 4/1970 | Sanford | 178/5.8 R |
| 3,493,674 | 2/1970 | Houghton | 178/5.6 |

*Primary Examiner*—Robert L. Griffin
*Assistant Examiner*—George G. Stellar
*Attorney, Agent, or Firm*—John T. O'Halloran; Menotti J. Lombardi, Jr.; Alfred C. Hill

[57] ABSTRACT

The invention describes a facsimile transmission system which allows facsimile pictures to be additionally transmitted in the field-blanking intervals over a normal transmission path for television signals. The mechanical relative movement between facsimile scanner and subject copy, which has been common in facsimile so far, is replaced by a selective electronic slippage between the facsimile frame produced with normal frame pickup units and the frame in whose field-blanking intervals the facsimile picture is to be transmitted line by line. Through the easily controllable slippage, sequential lines of the facsimile picture are transmitted in sequential field-blanking intervals, so that at the receiving end of the transmission path the facsimile frame can be reproduced without any special problems of synchronizing mechanical movements having to be solved.

14 Claims, 6 Drawing Figures

FACSIMILE TRANSMISSION SYSTEM

The present invention relates to a facsimile transmission system, i.e., a picture transmission system which, in this connection, as the term "facsimile" is not clearly defined, means any mode of transmitting pictures which differs from that used in public television.

From Sadatoski Itoh's article "Heim-FAX" (Radio-Mentor 1970, No. 8, pp. 534 – 536) a facsimile transmission system is known in which the facsimile signals are transmitted during the field - blanking interval. In that case, sequential lines of the subject copy are transmitted in sequential field-blanking intervals. To this end, the scanner scans the subject copy in the horizontal direction only, while vertical scanning is accomplished by moving the subject copy in the vertical direction. Thus, mechanical slippage between scanner and subject copy is used for transmission. At the reproducing end, the same principle is employed. The transmitted facsimile signal modulates the light spot of the scanner, which spot moves in the horizontal direction only.

The modulated light spot is imaged on a photosensitive layer, which finally is to show the reproduction of the transmitted picture. Here, too, vertical scanning of the photosensitive layer is accomplished by a mechanical vertical movement of the layer or carrier.

That system has a number of disadvantages. The mechanical movements of the photosensitive layers at the transmitting and receiving ends must be highly accurately synchronized, which is not easily done. A disadvantage which is decisive for many practical applications resides in the fact that normal pickup equipment and signal sources as are used in public television — particularly in the case of a still subject copy — cannot be employed. In this case, "pickup equipment" and "signal sources" mean television cameras, slide scanners, film scanners, electronic test patterns, and marker pulse generators. This also applies to the receiving end, where the vertical movement is necessary.

The present invention avoids these disadvantages, i.e., in the case of a still subject copy at the transmitting end and a still picture at the receiving end, use may be made of the normal aids of television engineering as are employed in public television. In particular, it is also possible to transmit still, three-dimensional scenes. The transmission system is therefore referred to as "Standard-TV-Facsimile System," abbreviated "STV-FAX." The advantageous characteristics of the system in accordance with the invention are obtained by the introduction of electronic slippage. The latter results in a great number of advantages which will be explained in the overall description of the system. To describe the overall system, reference is made to 6 figures, of which:

Figure 1:
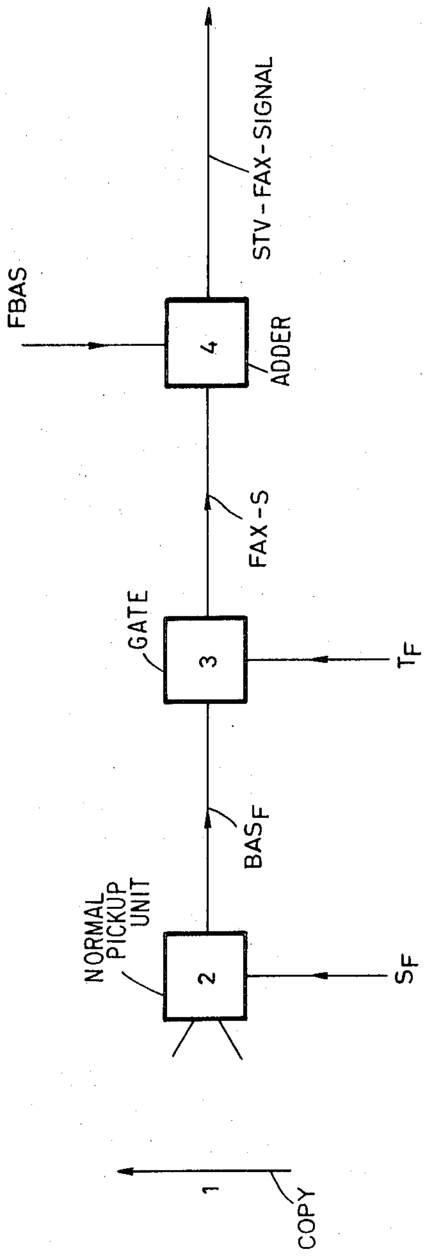
FIG. 1 shows the mixing of a standard signal FBAS and a facsimile signal FAX-S to form the Standard-TV-FAX signal STV-FAX-S)

FIG. 1 shows the diagram at the transmitting end for the formation of the signal to be transmitted, with the electronic slip already introduced. Any subject copy 1 is shot with a normal pickup unit 2, and the picture signal $BAS_F$ is produced. The pickup unit 2 provides the signal to be transmitted as the facsimile signal. Unit 2 may be a normal camera for color television as is used in television broadcasting, a slide projector, a film projector, an electronic test pattern, a marker pulse generator, or an alphanumeric character generator. The pickup unit is synchronized by the sync signal $S_F$. The signal $BAS_F$ is applied to the gate 3. The latter passes the signal $BAS_F$ only when the gating pulse $T_F$ is present. In this way, the facsimile signal FAX-S is obtained. The signal FAX-S is applied to the adder 4, where it is added to that FBAS signal in whose field-blanking interval the facsimile signal FAX-S is to be transmitted. Instead of the adder, an electronic switch may be used which switches the signal FAX-S into the signal FBAS. The FBAS signal may be a so-called black-and-white signal or a color signal. As an example, the color signal FBAS is drawn in. The FBAS signal will preferably be a standard television signal such as a signal with 50 fields per second and 625 lines per frame. However, the use of the invention is not limited to that standard; the invention is suitable for use with any existing television standard. The Standard-TV-Facsimile signal (STV-FAX-S) in whose field-blanking intervals the facsimile signal is transmitted is developed at the output of adder 4.

Electronic slippage is achieved by a special relationship between the sync signal $S_F$ and the gating pulse $T_F$. "Electronic slippage" means here that the line number of the signal FAX-S slips relative to the subject copy 1 although the latter rests and the gating pulse $T_F$ is normally associated with a fixed line number such as line No. 9. Thus, the "pulse scheme" (line duration) for the facsimile pickup unit is adapted so that the sequential lines of the facsimile raster can be accomodated in the respective same lines of the standard raster. By connection of the facsimile raster with the gating pulse $T_F$, the time "fit" of certain lines of the facsimile raster with the standard-raster lines selected for the transmission of the facsimile signal is achieved.

Figure 2:
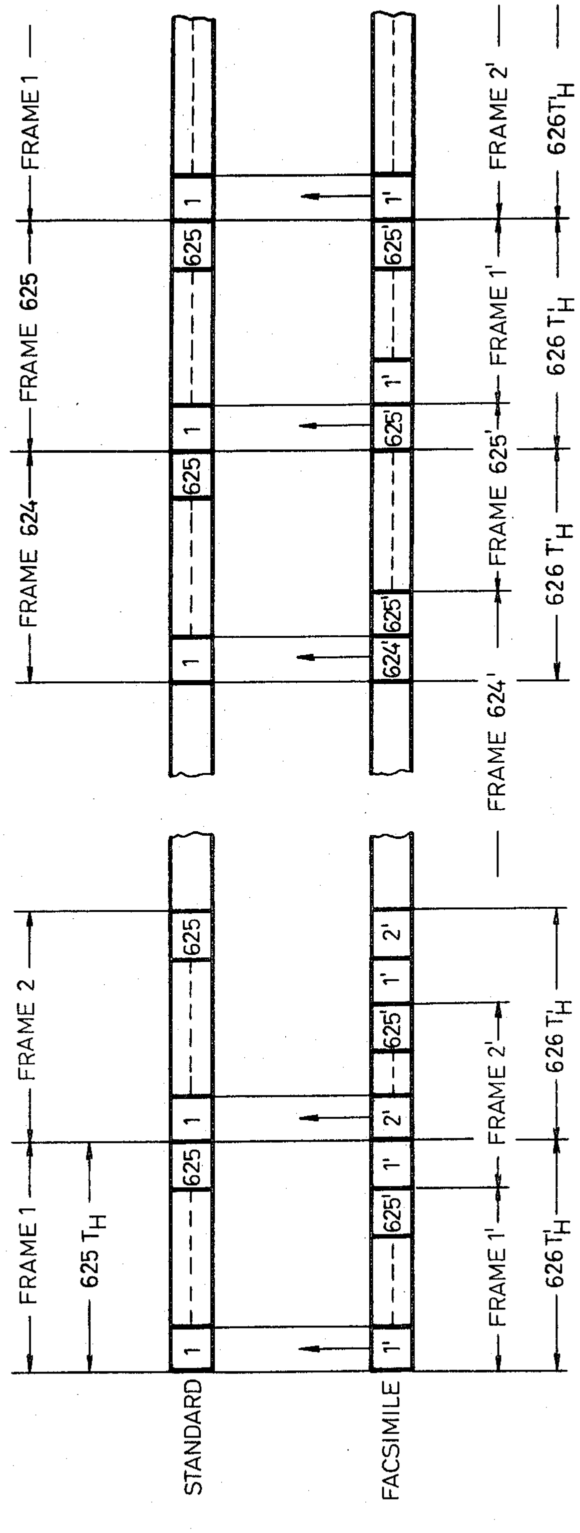
FIG. 2 shows, by way of example, the timing diagram of the electronic slip between a normal raster and the facsimile raster.

The idea of electronic slippage is demonstrated in FIG. 2 by way of one out of many possible examples. It is assumed that the horizontal duration of the deflection of the facsimile pickup unit 2 of FIG. 1 is a little bit shorter than that of the FBAS signal, in whose field-blanking interval the transmission is to be effected. For the television standard 625/50, for example, the following relation may hold:

$$T_H' = 625/626\ T_H,$$

where $T_H'$ is the horizontal duration of the facsimile pickup unit 2, and $T_H$ is the horizontal duration of the FBAS standard signal. In the television standard 625/50, both rasters write 625 lines per frame. FIG. 2 shows the time sequence of the standard raster and that of the facsimile raster in common, with the sequence of the frames being given. In the frames, the lines 1 and 625 are designated here. With FIG. 2 representing only one example, one can see the following: In the frame 1, the beginning of the facsimile line 1' coincides with the beginning of the standard line 1. In the frame 2, the beginning of line 1 coincides with the beginning of 2′, etc. Hence, the facsimile raster slips relative to the standard raster in a defined manner (electronic slippage). Thus, if the signal $BAS_F$ is gated with the gating pulse $T_F$ of FIG. 1 during the standard line 1, sequential lines of the facsimile pickup unit 2 will appear in the signal FAX-S in sequential frames. The gating pulse $T_F$ may be placed into any line of the standard signal FBAS; preferably, however, it will be placed into the field-blanking interval of FBAS.

The electronic slippage of FIG. 2 represents the simplest, but not the only possibility. For FIG. 2, the following relations hold:

$$T_H' = Z/Z+1\ T_H;\ f_H' = Z+1/Z\ f_H$$

$$T_B' = Z/Z+1\ T_B;\ f_B' = Z+1/Z\ f_B,$$

where $T_H'$ = line duration of the facsimile raster
$f_H'$ = line frequency of the facsimile raster
$T_H$ = line duration of the standard raster
$f_H$ = line frequency of the standard raster
$T_B'$ = frame duration of the facsimile raster
$f_B'$ = frame frequency of the facsimile raster
$T_B$ = frame duration of the standard raster $f_B$ = frame frequency of the standard raster $Z$ = line number of the standard frame.

It is, of course, also possible to transmit one facsimile line per field. In that case, the duration of transmission is halved. Also, a line number of the facsimile raster which is increased or decreased by F can be chosen for each field or each frame of the standard raster. Then, the following relations are generally valid:

$$T_H' = Z/Z+F\ T_H;\ f_H' = Z+F/Z\ f_H$$

$$T_B' = Z/Z+F\ T_B;\ f_B' = Z+F/Z\ f_B$$

$$T_H'' = z/z+F\ T_H;\ f_H'' = z+F/z\ f_H$$

$$T_V' = z/z+F\ T_V;\ f_V' = z+F/z\ f_V$$

where $T_V'$ = field duration of the facsimile raster
$f_V'$ = field frequency of the facsimile raster
$T_V$ = field duration of the standard raster
$f_V$ = field frequency of the standard raster
$Z$ = line number of the frame
$z$ = line number of the field Electronic slippage is also achieved if, in the above relations, the reciprocals of the fractions are formed, i.e., if, for example, the fraction $Z/(Z+F)$ is replaced by $(Z+F)/Z$.

If $F$ becomes greater than 1, it is possible that the facsimile lines no longer coincide with the standard-raster lines selected for transmission and that interference-free transmission is impossible. This is avoided if, at the transmitting end, delay lines and electronic switches insure that the facsimile lines are properly located within the standard lines. In the facsimile receiving equipment, it must then be insured that the facsimile lines are restored to the proper time sequence with the aid of delay lines and electronic switches. If all free lines in the field-blanking interval are utilized in this manner, it becomes possible to transmit a facsimile frame within about one second. Thus it is possible to transmit sequences of motions with the facsimile transmission system, in which case, however, a component picture of the sequence of motions is transmitted only about every second. For many applications such as telemetering and remote viewing, this is sufficient. If the line duration of the facsimile raster is made greater than that of the standard raster, electronic slippage occurs, too. In the above formulas, + F must then be replaced by −F. The use of the system with a normal pick-up unit and the electronic slippage is, of course, not limited to the transmission of only one facsimile signal. The signals of several facsimile signal generators can be inserted into different lines of a standard signal. In theory, it is possible to transmit as many facsimile signals as the standard system has lines per frame. It is, of course, also possible to go in the opposite direction and transmit one facsimile line per 1.5 or 2 or 2.5 or 3, etc.; frames.

Figure 3:
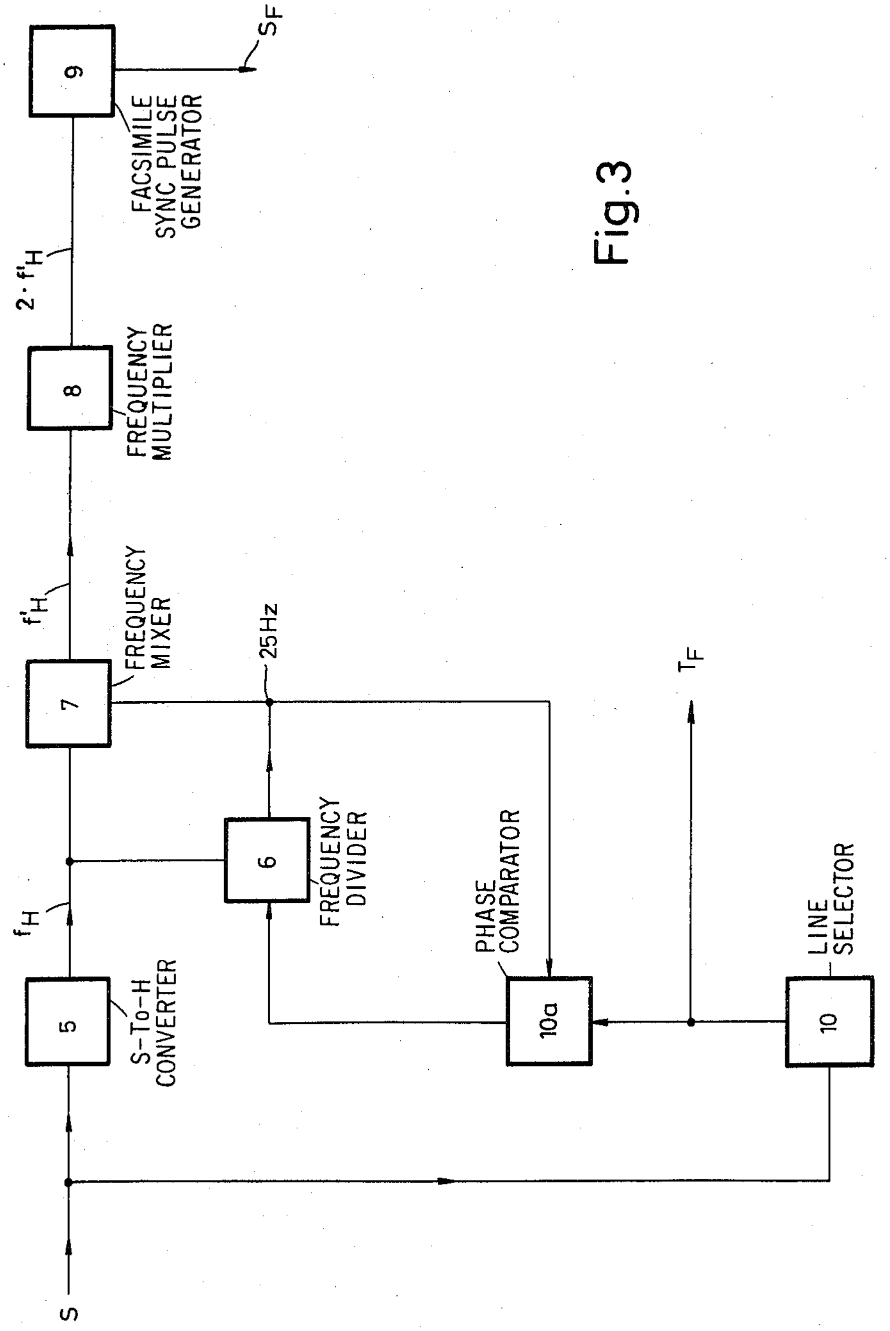
FIG. 3 shows a diagram for obtaining the electronic slip at the transmitting end.

To obtain the time sequence of FIG. 2, the standard sync signal S, with which the standard signal FBAS is produced, and the facsimile sync signal $S_F$ must be mixed in the television studio, for example. FIG. 3 shows an example of a processing diagram. In the S-to-H converter 5, the sync signal S, with the aid of which the standard signal FBAS is produced, is converted into a signal having the frequency $f_H$. With the frequency divider 6, this signal is frequency-divided by 625, so that 25 Hz are obtained in our 625/50 standard. With the 25-Hz oscillation, the signal $f_H$ is increased in frequency by + 25 Hz in the stage 7, so that a signal having the frequency $f_H'$ is obtained. In the multiplier 8, $f_H'$ is multiplied by the factor 2. With this oscillation, the common studio pulse generators, which supply a sync signal, horizontal signal, vertical signal, and blanking signal, can normally be synchronized. In the present case, the thus synchronized pulse generator is referred to as "facsimile pulse generator" 9 because its sync signal $S_F$ is used to synchronize the facsimile pickup unit in FIG. 1. If necessary, the signals $H_F$, $V_F$, and $A_F$ of the pulse generator 9 may also be applied to the pickup unit. For synchronization through signals applied from outside, many pulse generators 9 need an oscillation with the double line frequency, which must be assumed to be $2f_H'$, as shown in FIG. 3. Through frequency division by 2, the pulse generator 9 forms therefrom its line frequency $f_H'$. However, the manner in which the frequency divider locks is ambiguous, so that the horizontal sync signal in $S_F$ can shift by one-half period relative to $f_H'$. To achieve unambiguity, $S_F$ must be compared with $f_H'$, and unambiguity must be insured with a signal taken from the comparison.

The gating pulse $T_F$ is derived from the signal S with the aid of the line selector 10. To accomplish this, use may be made of the methods common in test-line technology. The signal $S_F$ and the signal $T_F$ must be in a certain phase relation which insures that the respective facsimile-raster line to be transmitted begins simultaneously with the selected standard-raster line, which is determined by the signal $T_F$. To insure this relationship, the 25-Hz oscillation at the output of the divider 6 is compared with the signal $T_F$ in the coincidence stage 10*a*. The output signal of the coincidence stage disturbs the division ratio of the divider 6 until the phase coincidence of both signals is achieved.

Prices of highly stabilized frequency generators are coming down. Such generators may be used instead of the processing layout of FIG. 3 to produce S and $S_F$.

Figure 4:
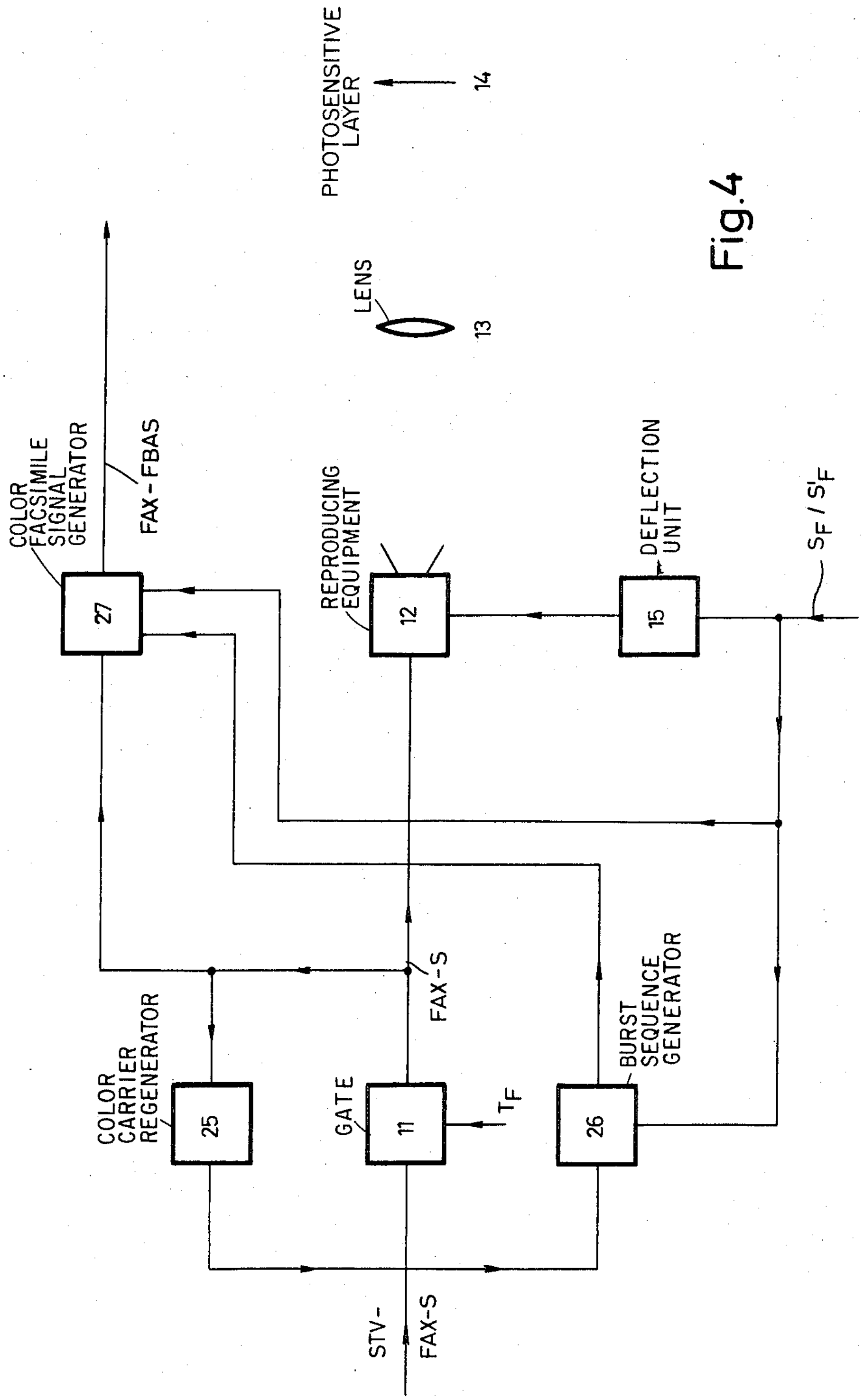
FIG. 4 shows a diagram for reproducing the facsimile signal STV-FAX-S at the receiving end.

At the receiving end, the signal STV-FAX-S is available, which was transmitted either as a video-frequency signal or as a radio-frequency signal. As shown in FIG. 4, this signal passes through the gate 11, which is opened with the pulse $T_F$. The passed signal FAX-S controls the beam intensity in a picture reproduction equipment 12. This reproduction equipment may be a special design, but will preferably contain a normal picture tube. In this connection, "normal picture tube" means a picture tube with which television pictures can be reproduced in the usual manner, or a picture tube as is commonly used in film and slide scanners. It is particularly significant here that the picture tubes of the slide and film scanners have a very short persistence. This is important in connection with the use of the reproducing equipment 12 in the television episcope. It should be noted that oscillograph tubes, lasers and storage tubes may also be used to reproduce the signal FAX-S. The light spot produced by the equipment 12 is imaged with a lens 13 on a photosensitive layer 14. The photosensitive layer may be: photographic paper, photographic film, Polaroid film. If the photosensitive layer 14, after its development, shows a negative of the subject copy 1, the signal FAX-S is reversed in its polarity as is commonly done during negative scanning. If the photosensitive layer causes undesirable distortion in the picture gradation, the signal FAX-S is suitably pre-equalized. The deflection of the light spot of the equipment is effected with the deflection unit 15, which is operated with $S_F$ or $H_F$, $V_F$ and $A_F$. The deflection of the light spot in 12 may be adjusted so as to take place in the horizontal direction only if the signal FAX-S modulates the sweeping beam in the reproduction equipment. A sweeping beam may be either an electron beam or a light beam, e.g., of a laser. Vertical deflection may be carried out continuously or stepwise at a slow rate corresponding to the sequence of the incoming signals FAX-S. Since this has many advantages, deflection will preferably be carried out like in the facsimile pick-up unit 2 of FIG. 1, i.e., with 625 lines per frame and approximately 50 fields per second. In that case, $T_F$ and $S_F$ or $H_F$, $V_F$, $A_F$ must be coupled in the same way as in FIG. 1.

For recording the picture as shown in FIG. 4, the lens 13 may be dispensed with if, for example, the photosensitive layer 14 is brought into direct contact with the screen of a normal picture tube. This will be advantageously applicable also if the reproduction equipment 12 is a tube in which the electron beam, deflected in the horizontal and vertical directions, impinges directly on the photosensitive layer 14 through a transparent window.

Figure 5:
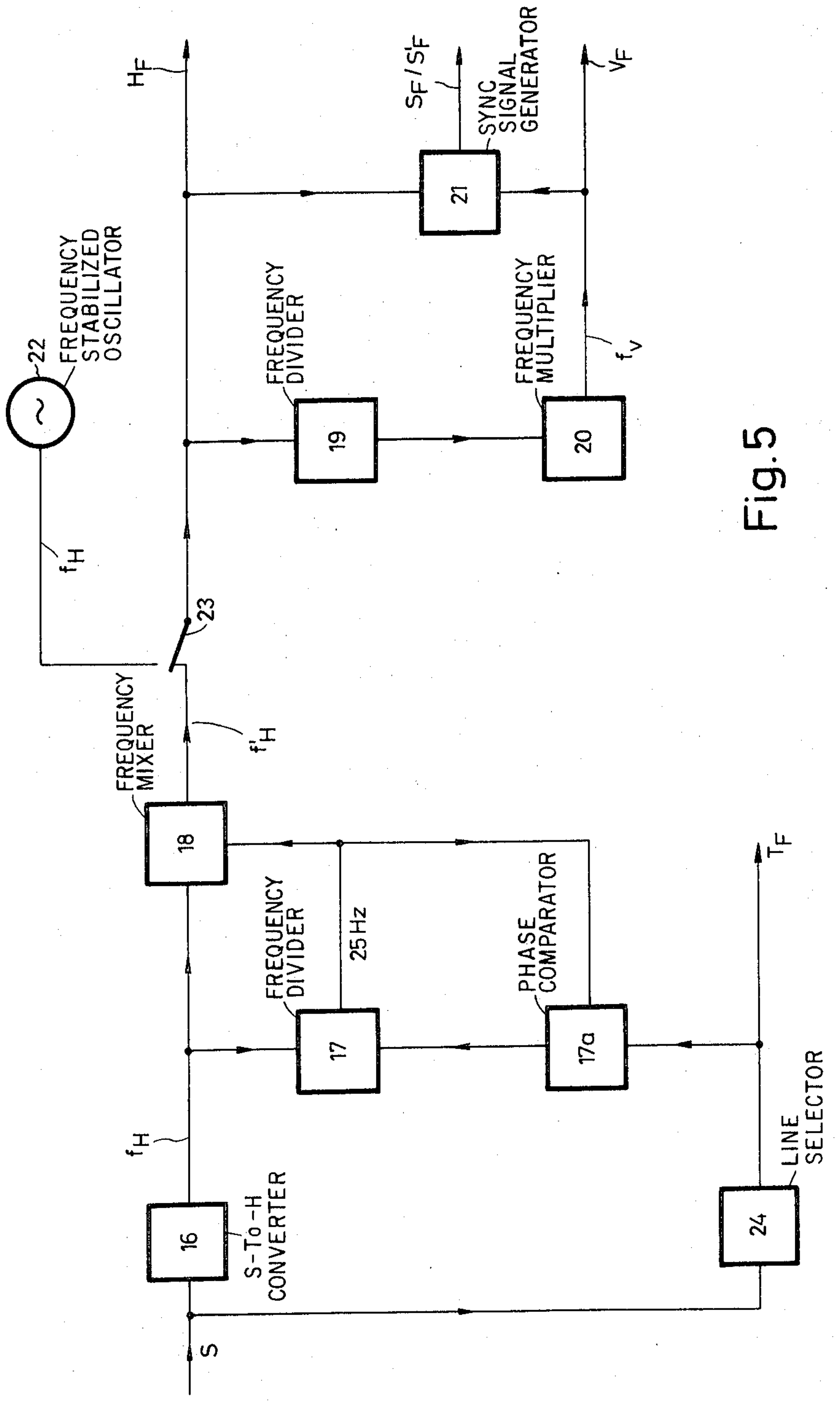
FIG. 5 shows a diagram for producing the electronic slip at the receiving end.

The mixing ("coupling") of S and $S_F$ or $H_F$, $V_F$ and $A_F$ may be carried out, for example, in accordance with the diagram shown in FIG. 5.

In an S-to-H converter 16, the transmitted signal S is converted into the line-frequency oscillation $F_H$ or $H_F$, whose frequency is divided by 625 with the divider 17, so that 25 Hz are obtained. In the stage 18, this frequency is used to form $f_H' = f_H + 25$ Hz, where $f_H$ = line frequency. The signal with the frequency $f_H'$ is passed on as the horizontal sync signal $H_F$. THe frequency $f_H'$ is divided by 625 in the divider 19 and multiplied by 2 in the multiplier 20. Thereafter, an oscillation $V_F$ with the frequency $f_V$ is available. The oscillations $H_F$ and $V_F$ can be used to synchronize the deflection unit 15. If necessary, a blanking signal can be formed from the oscillations $H_F$ and $V_F$. In particular, a sync signal $S_F$ can be formed with the aid of the stage 21. The oscillation $V_F$ with the frequency $f_V'$ must bear a certain phase relationship with the vertical-frequency component in the signal $S_F$ at the transmitting end in FIG. 3 in order that the fascimile signal FAX-S is reproduced at the proper point in the picture. It should be noted that this fixed phase relationship can be achieved if, as shown in FIG. 3, the pulse $T_F$ is compared with the corresponding component in the signal $S_F$ and the resulting comparison signal is transmitted, too. At the receiving end, $T_F$ is compared with the corresponding component in the signal $S_F$ as shown in FIG. 5. From the comparison of both comparison voltages, a further signal can be derived with the aid of which the phase of $V_F$ is influenced. For the puspose described below, a frequency-stabilized oscillator 22 may be installed, which oscillates at the line frequency $f_H$. The output oscillation of the oscillator 22 is applied to a switch 23, with which $f_H'$ or $f_H$ can be selectively advanced. In this way, a sync signal $S_F'$ can be generated in the equipment itself, and this signal is also available at the output of the stage 21. If, as shown in FIGS. 1 and 3, highly stabilized generators are used at the transmitting end to produce the sync signals S and $S_F$, highly stabilized generators may also be used for the facsimile receiver to produce the necessary sync signals. The gating pulse $T_F$ is generated with the aid of the line selector 24. For the same reasons as in FIG. 3, the 25-Hz oscillation at the output of the divider 17 is compared with the signal $T_F$ in the coincidence stage 17 *a.* The output signal of the coincidence stage disturbs the division ratio of the divider 17 until the phase coincidence of both signals is achieved.

According to the invention, the overall transmission system of FIGS. 1 to 5 can be used in various ways. Aside from many types of picture material, which may be transmitted during a normal television program, pictures or signals may be transmitted which give information about, e.g., the transmitting station, or stock market prices and similar news of general interest such as the weather chart or current forecasts made on the basis of incoming election results are continuously transmitted. The use of the system in accordance with the invention is also interesting on airports because there an entertainment program can be transmitted with a standard signal and the departure times with the facsimile signal, for example. It is also possible to continuously transmit data which are linked with the electronic data processing system. The system in accordance with the invention has another highly interesting and important application, namely the photographing of single television pictures. While this is already possible with a normal television receiver and a normal photographic camera, one tends to avoid this method because it is cumbersome due to the adjustments required. A facsimile receiving equipment, however, contains nearly all parts needed to make single-frame exposures of a telecast, such as photo-sensitive layers 17, lens 13, reproduction equipment 12, synchronizing and deflection unit 15, which is suitable for the normal sweep frequencies. It is only necessary to provide an electronic auxiliary equipment which takes care of the necessary keying and control if the facsimile receiving equipment is fed with a standard video-frequency signal from a normal r.f. receiver or if this video-frequency signal is derived in the facsimile receiver itself with the aid of an r.f. demodulator.

During facsimile transmissions, it will frequently be necessary to transmit small details or written pages, particularly DIN-A-4 pages, with the best possible recognizability. In that case, the reproducibility can be considerably increased by not completely imaging a DIN-A-4 page, for example, on a diapositive or on the photo-sensitive layer of a television camera. Since a vertical DIN-A-4 page halved transversely in the middle gives two smaller sizes with nearly the same height-to-width ratio of 3 to 4, a DIN-A-4 page will be transmitted in two steps, i.e. successively in two television frames, which, at the receiving end, again result in a DIN-A-4 page if the transmitted pictures are arranged vertically one upon the other with the necessary accuracy.

For facsimile color television transmissions, the picture tube 12 may be a color picture tube, and the thus produced color picture may be imaged on a layer 14, which, after its development, shows a colored picture. Suited for this purpose is, for example, a color Polaroid film. For facsimile color transmission, a color television camera, a color slide scanner or a color film scanner will be used at the transmitting end. From their output signal, a PAL, NTSC, SECAM, FAM, ART, SECAM-IV, line-sequential or frame signal is formed. In the case of NTSC or PAL signals, only one burst (color sync signal) per frame will be present after gate 3 in FIG. 1 if one line per frame is transmitted. However, this one burst is not sufficient to regenerate the color carrier in the receiver with a normal color demodulator or color carrier regeneration circuit. In the facsimile receiving equipment, therefore, the gate 11 in FIG. 4 will be followed by a color carrier regenerator 25 for whose operation the transmitted bursts are sufficient. The device 26 forms from $S_F$ and the regenerated color carrier a burst sequence which, along with the signals FAX-S and $S_F$, forms in the device 27 a facsimile FBAS signal (FAX-FBAS) which can be converted by a normal color decoder into a facsimile color television picture. The devices 25, 26 and 27 are rendered unnecessary if an FAM or ART facsimile signal is transmitted because the FAM and ART systems must not necessarily use a burst. If the PAL system is to be fully utilized, at least two sequential facsimile lines will be transmitted in each case. In the SECAM, SECAM-IV and ART systems, the transmission of at least two sequential lines per frame or per field is necessary because of the delay line in the receiver and because of the signal sequence. In the SECAM system, the necessary storage of sequential lines can also be achieved in approximation via the photosensitive layer 14. With the FAM signal, it is necessary to gate the demodulated signal R-Y with the gating pulse $T_F$.

Figure 6:
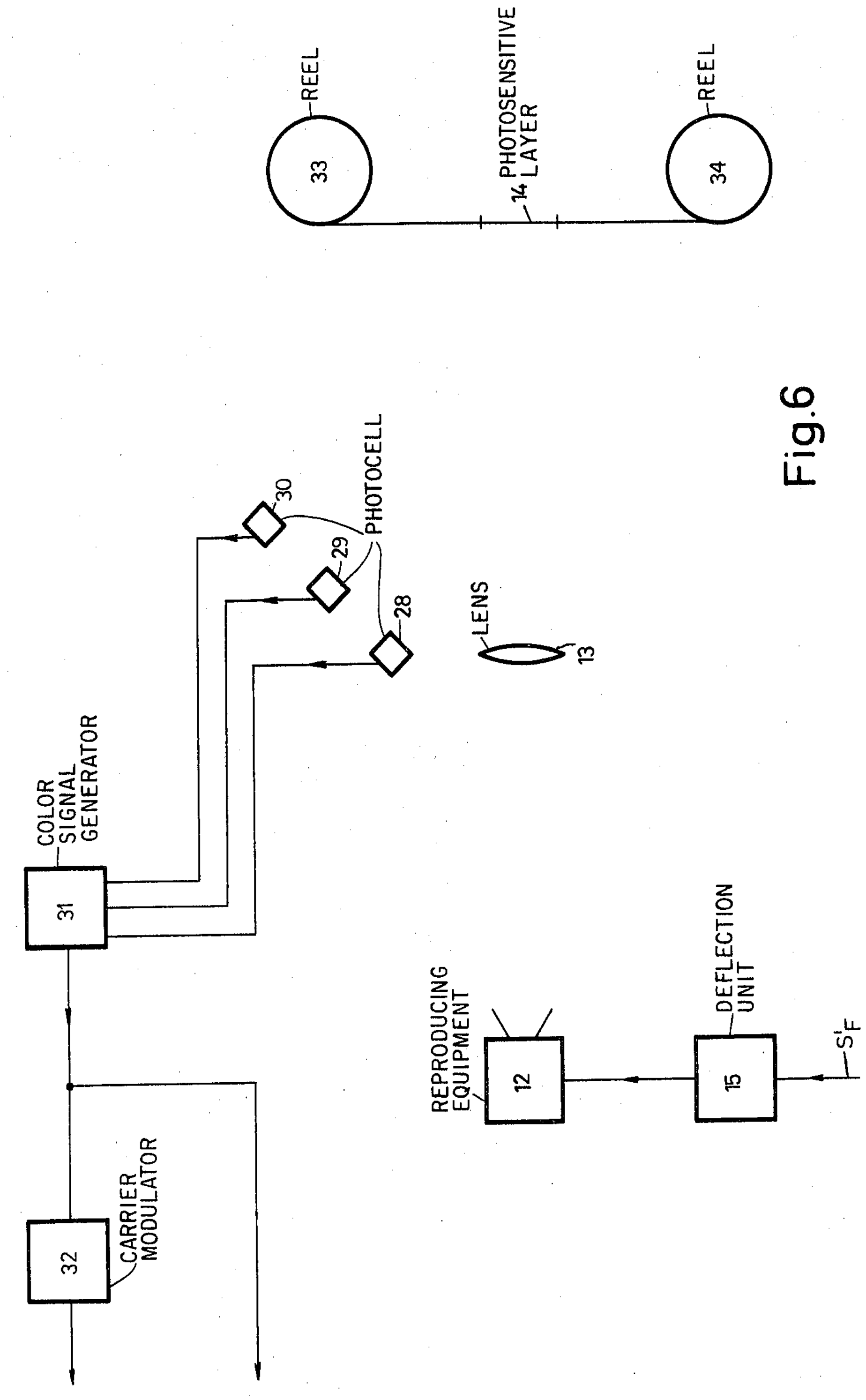
FIG. 6 shows a diagram of the facsimile reproduction equipment for episcope scanning.

Another color transmission possibility consists in the following: From the output signals of the color facsimile pickup unit 2, the signals R-Y, B-Y, and Y are formed. With R-Y and B-Y or I and Q or other combinations of the chrominance signals R, G, B or with R, G, B, two color carriers are amplitude-modulated, or two color carriers are frequency-modulated, or one carrier is FAM-modulated, or one carrier is NTSC-modulated. The NTSC carrier additionally contains a pilot carrier. The selected color carrier(s) is (are) added to the luminance signal. The thus formed signal is transmitted as shown in FIGS. 1 to 5 and, in the facsimile receiving equipment, recorded on a carrier capable of recording black-and-white and half tones only. The thus stored information on the color picture is evaluated during episcope operation of the reproduction equipment. FIG. 6 shows the diagram. The picture 14 was recorded with the equipments 12, 13 and 15. To evaluate the stored information during so-called episcope operation, an unmodulated raster is written on the reproduction equipment 12, which raster is imaged with the lens 13 on the picture 14. If only a black-and-white record with coded color is present on 14, the reflected light is picked up with a photocell 28. If 14 represents a colored picture, the three photocells 28, 29 and 30 are used. In a unit 31, a color signal suitable for the color receiver to be used is produced from the signals of the photocells. In particular, this signal can be used to modulate an r.f. carrier in the unit 32, so that the signal can be more easily fed to a normal color television receiver. The information carrier 14 remains within the facsimile reproduction equipment and is rewound between the reels 33 and 34 as required. For episcope operation, the synchronization of the deflection unit 15 is effected with the sync signal $S_F'$, which is obtained with the aid of the oscillator 22 and of the elements 19, 20 and 21.

Under certain conditions, the recording of the luminance signal or of the modulated color carrier(s) on only one picture may prove inappropriate. In that case, the overall system will be operated as follows: The total information is recorded in known manner on two pictures, i.e., in the facsimile receiving equipment the luminance signal is recorded on one picture, and the color information on a second, directly following picture. During evaluation in episcope operation, the scanning spot produced by the unit 12 is divided into two scanning spots. One scanning spot scans the picture of the luminance signal, and the second scanning spot simultaneously scans the picture of the color information, so that, with suitably mounted photocells, a signal with the luminance information and a signal with the color information are formed. If need be, provision will have to be made for shielding and separation to avoid any interaction of the two recorded data.

When looking at the facsimile signal transmitted in the standard signal, one finds out that the facsimile signal, too, contains lines which contain no useful information whatsoever. This means that the facsimile signal can be used to transmit a sub-facsimile signal, which, of course, needs considerably more time for its transmission. If, for example, a facsimile picture is transmitted within 12.5 seconds, because one facsimile line is transmitted per standard field, 2 sub-facsimile lines may be transmitted within 12.5 seconds if one sub-facsimile line is transmitted per facsimile field. It is, of course, also possible to transmit several sub-facsimile lines per facsimile field. With one sub-facsimile line per facsimile field, the transmission of a sub-facsimile picture with 625 lines per frame takes about 65 minutes. A certainly advantageous application of the sub-facsimile transmission will be the transmission of the presently used test lines because their measuring function can also be performed if one test line per 6.25 seconds is available. The sub-facsimile picture may also be derived from any subject copies with the aid of normal pickup units by using the electronic slippage. The sub-facsimile signal may also be produced by use of the mechanical slippage. The sub-facsimile signal may, in turn, transmit a sub-facsimile signal, etc.

In FIG. 4, a normal film, a Polaroid film or sensitized paper is provided as the record carrier. For some applications it will be more appropriate to choose a different record carrier. For example, the transmitted facsimile signal may be recorded with a normal tape recorder and used again later on. Or the facsimile signals are recorded with a magnetic disc. If the magnetic disc is caused to rotate so as to perform, for example, one revolution per frame duration of the facsimile raster, one transmitted facsimile frame can just be recorded along a circular line on the disc. With the many possible circular lines, many facsimile frames can then be recorded, with sequential lines directly succeeding each other on the magnetic disc. When scanning a circle on the disc, one then obtains directly a television signal capable of being transmitted, with 50 fields per second and 625 lines per frame with interlacing line. This consideration applies to any television standard. Recording may be carried out in the same way as on a video disc.

It may be necessary to record the transmitted facsimile lines relatively slowly, i.e., within a period longer than the line duration, e.g., within the time which elapses until the next facsimile line arrives. In that case, a line just coming in will be fed to a storage, and slow interrogation of the storage will be started immediately, in which case the interrogation time must be the time up to the arrival of the next facsimile line.

What is claimed is:

1. A facsimile transmission system for the transmission of facsimile signals during the vertical blanking intervals of a standard television signal comprising:
a first source of standard television signal having a first sync signal;
a second source of facsimile signal; and
a first electronic control means coupled to said first and second sources responsive to said first sync signal to insert said facsimile signal into at least a selected one of said vertical blanking intervals of said standard television signal, said first control means introducing both a horizontal synchronizing frequency and vertical synchronizing frequency electronic slip of the facsimile signal raster relative to a standard television signal raster, said first control means producing a standard-television-facsimile signal.

2. A system according to claim 1, further including
a plurality of said second source, and
said first control means inserts the facsimile signal of each of said plurality of said second sources in different selected ones of said vertical blanking intervals.

3. A system according to claim 1, further including
a reproduction means for said facsimile signal; and
a second electronic control means coupled to said first control means and said reproduction means, said second control means being responsive to said first sync signal to produce control signals to control said reproduction means, said control signals providing said electronic slip and separating said facsimile signal from said standard-television-facsimile signal.

4. A system according to claim 3, wherein
said second source includes
a pickup device commonly employed in standard television systems; and
said reproduction means includes
equipment commonly employed in standard television systems.

5. A system according to claim 3, wherein
said first and second control means are adjusted to provide said electronic slip according to the following relations $$T_H' = Z/Z \pm F\ T_H\ ;\ T_H' = z/z \pm F\ T_H$$

$$T_B' = Z/Z \pm F\ T_B\ ;\ T_V' = z/z \pm F\ T_V,$$

where $T_H'$ equals the line duration of said facsimile raster, $T_H$ equals the line duration of said standard raster, $T_B'$ equals the frame duration of said facsimile raster, $T_V'$ equals the field duration of said facsimile raster, $T_V$ equals the field duration of said standard raster, $T_B$ equals the frame duration of said standard raster, Z equals the line number of a standard frame, $z$ equals the line number of a standard field and F equals the change of line number of said facsimile raster.

6. A system according to claim 3, wherein
said first and second control means are adjusted to provide said electronic slip according to the following relations $$f_H' = Z \pm F/Z\, f_H\ ;\ f_H' = z \pm F/z\, f_H$$

$$f_B' = Z \pm F/Z\ f_B\ ;\ f_V' = z \pm F/z\, f_V,$$

where $f_H$ equals the line frequency of said standard raster, $f_H'$ equals the line frequency of said facsimile raster, $f_B'$ equals the frame frequency of said facsimile raster, $f_B$ equals the frame frequency of said standard raster, $f_V'$ equals the field frequency of said facsimile raster, $f_V$ equals the field frequency of said standard raster, $Z$ equals the line number of a standard frame, $z$ equals the line number of a standard field and $F$ equals the change of line number of said facsimile raster.

7. A system according to claim 3, wherein
said first control means reverses the polarity of said standard-television-facsimile signal when said reproduction means produces negative pictures only.

8. A system according to claim 3, wherein
said second source is controlled by a second sync signal derived from said first sync signal; and
said first control means includes
first circuit means to lock said first and second sync signals together in a predetermined frequency difference with respect to each other to insure said electronic slip.

9. A system according to claim 8, wherein
said second control means includes
second circuit means to lock said control signals and said first sync signals in said predetermined frequency difference with respect to each other to insure said electronic slip.

10. A system according to claim 3, wherein
said first control means includes
first switching means coupled to said first and second sources to insert said facsimile signal into said selected one of said vertical blanking intervals.

11. A system according to claim 10, wherein
said second control means includes
second switching means coupled to said first control means and under control of at least one of said control signals to separate said facsimile signal from said standard-television-facsimile signal for reproduction.

12. A system according to claim 3, wherein
said second source provides color facsimile signals for transmission.

13. A system according to claim 12, wherein
said reproduction means includes
first circuit means to reproduce color facsimile picture when color facsimile signals are transmitted.

14. A system according to claim 13, wherein
said first circuit means operates as a television episcope.

* * * * *